United States Patent [19]
McEwen et al.

[11] Patent Number: 5,637,213
[45] Date of Patent: Jun. 10, 1997

[54] IMMERSIBLE FILTER DRUM UNIT AND METHOD FOR ASSEMBLING THEREOF

[75] Inventors: Stephen N. McEwen, Bowling Green; Jay M. Creps, Culleoka; Scott M. McEwen, Bowling Green; Richard A. Hallet, Delta; Robert F. Benschoter, Portage; Barry Benschoter, Bowling Green, all of Ohio

[73] Assignee: Henry Filters, Inc., Bowling Green, Ohio

[21] Appl. No.: 324,148

[22] Filed: Oct. 17, 1994

Related U.S. Application Data

[63] Continuation-in-part of Ser. No. 967,196, Oct. 27, 1992, Pat. No. 5,389,256, which is a continuation-in-part of Ser. No. 575,338, Aug. 30, 1990, Pat. No. 5,158,691.

[51] Int. Cl.$^6$ .................... B01D 33/067; B01D 33/42
[52] U.S. Cl. .................... 210/232; 210/326; 210/330; 210/402; 210/489; 210/498; 210/499; 210/784
[58] Field of Search .................... 210/767, 780, 210/784, 232, 326, 330, 331, 347, 402, 486, 498, 499, 323.1, 489

[56] References Cited

U.S. PATENT DOCUMENTS

| | | | |
|---|---|---|---|
| 1,259,139 | 2/1918 | Salisbury | 210/331 |
| 1,540,325 | 6/1925 | Fuller | 210/498 |
| 2,165,931 | 7/1939 | Levy | 210/347 |
| 2,885,083 | 5/1959 | Peterson et al. | 210/327 |
| 3,096,278 | 7/1963 | Francom | 210/331 |
| 3,283,906 | 11/1966 | Crane et al. | 210/347 |
| 3,395,801 | 8/1968 | Müller | 210/331 |
| 3,708,848 | 1/1973 | Guinard | 29/163.8 |
| 4,045,853 | 9/1977 | White | 210/402 |
| 4,083,787 | 4/1978 | White | 210/402 |
| 4,131,548 | 12/1978 | Peterson | 210/396 |
| 4,179,378 | 12/1979 | Borre | 210/486 |
| 4,347,208 | 8/1982 | Southall | 210/331 |
| 4,637,876 | 1/1987 | Dosoudil | 210/331 |
| 4,793,923 | 12/1988 | Kadoya et al. | 210/496 |
| 4,836,917 | 6/1989 | Tomita et al. | 210/396 |
| 4,861,433 | 8/1989 | Eriksson | 210/326 |
| 4,897,192 | 1/1990 | Lawrence | 210/330 |
| 4,932,112 | 6/1990 | Tikkanen | 210/498 |
| 4,957,630 | 9/1990 | Bratten | 210/402 |
| 5,008,010 | 4/1991 | Langer | 210/232 |
| 5,028,324 | 7/1991 | Teinert | 210/232 |
| 5,227,064 | 7/1993 | Strid | 210/327 |
| 5,258,120 | 11/1993 | Knodel et al. | 210/331 |

*Primary Examiner*—John Kim
*Attorney, Agent, or Firm*—Brooks & Kushman P.C.

[57] ABSTRACT

Filter apparatus for filtering contaminants from a fluid, such as machine tool coolant, are disclosed. One filter apparatus includes a filter drum unit having a generally cylindrical open perforated support sheet with a cylindrical screen element mounted thereabout. Circumference varying mechanisms, such as turnbuckles, are connected relative to the support plate to vary the circumference of the support plate and the tautness of the screen element. A disc filter assembly having a mandrel and fluidly attached annular disc filter elements is also described. Each annular disc filter element has an inner structure with concentric ribs forming concentric grooves therebetween which are connected to radially extending grooves. A screen element is supported by the ribs so that the microscreen will not tear while allowing filtering of fluid into the grooves which are in fluid communication with the mandrel. A disc filter assembly having a mandrel in fluid communication with a plurality of rectangular disc filter elements is also described. Each disc filter element has a rectangular inner structure which is pleated or folded in an accordion-like fashion. A retainer secures screen elements about the inner structure to prevent contaminants from passing therebetween.

17 Claims, 12 Drawing Sheets

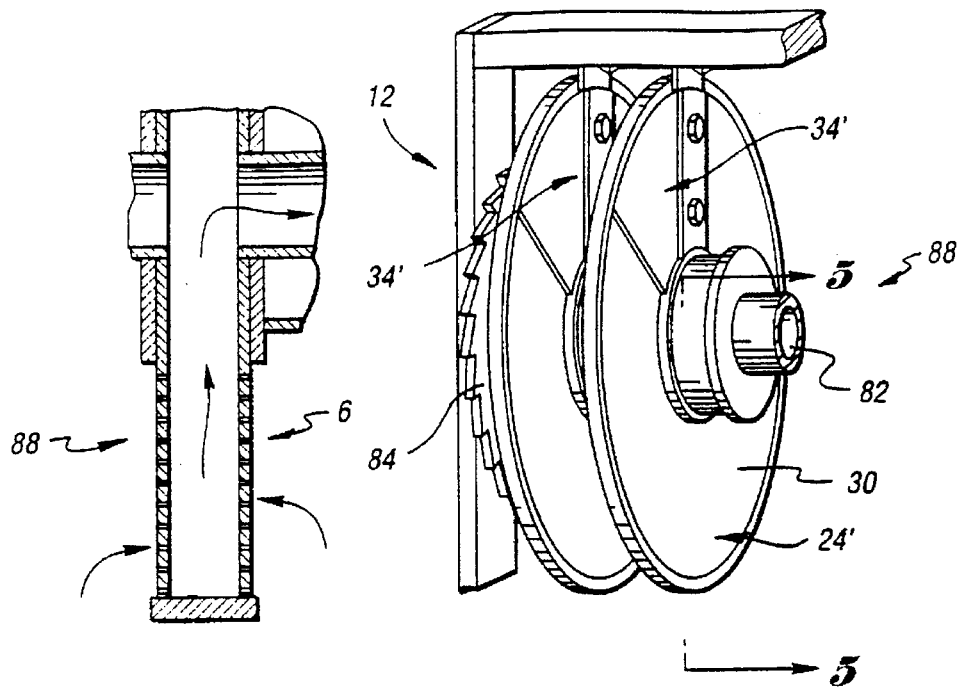
Fig. 5  Fig. 4
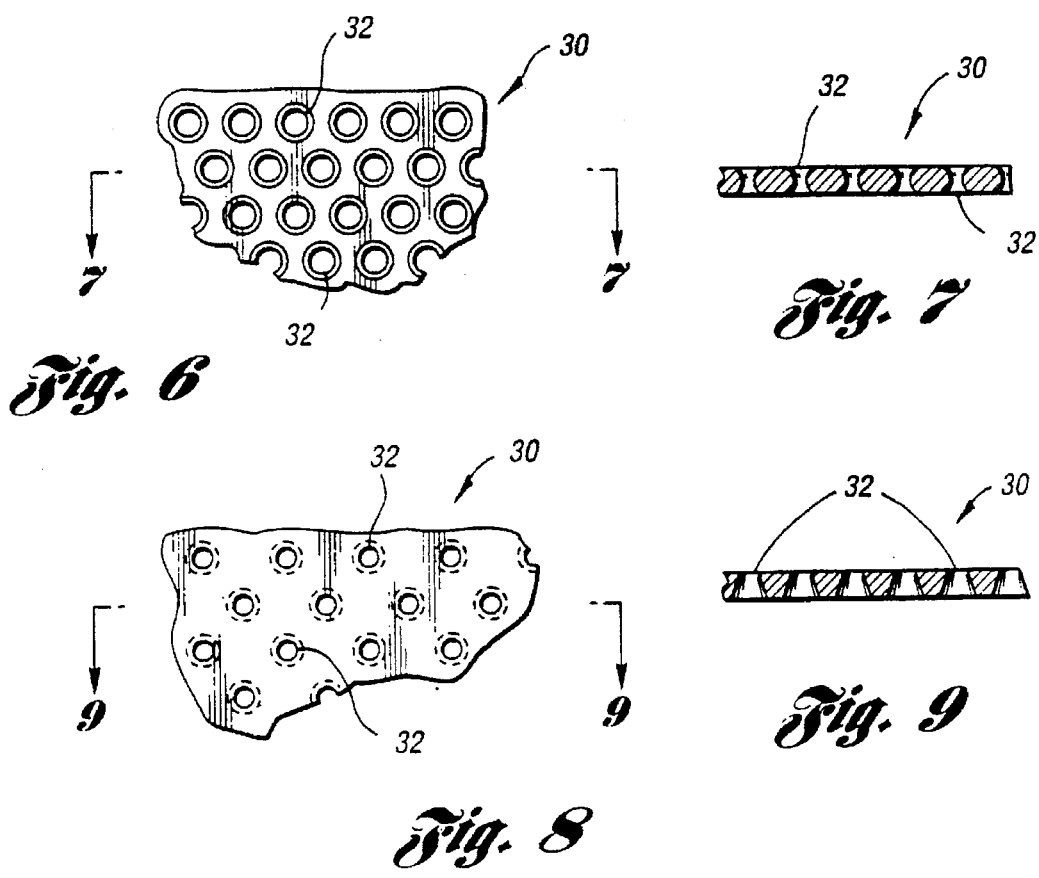
Fig. 6  Fig. 7
Fig. 8  Fig. 9

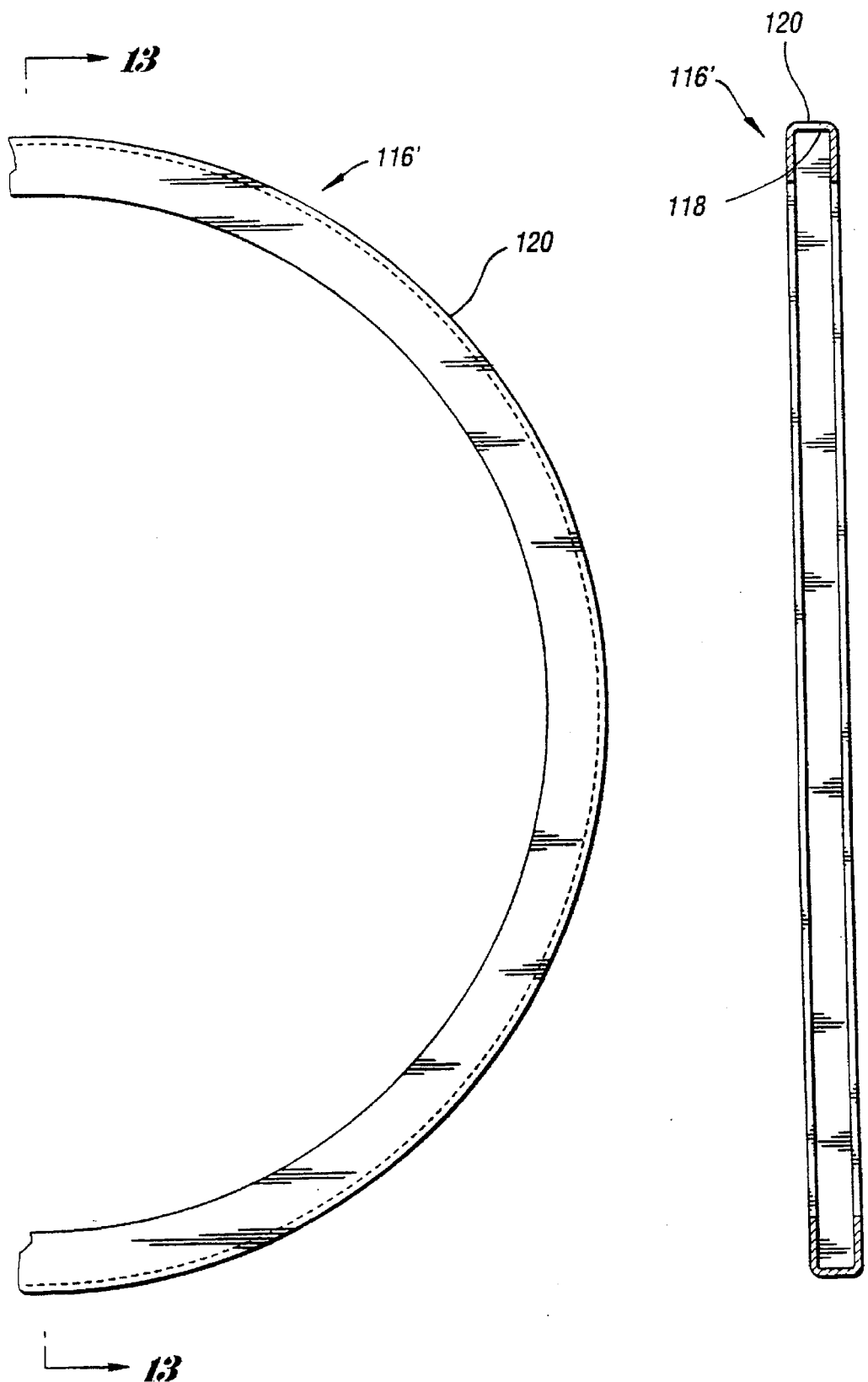

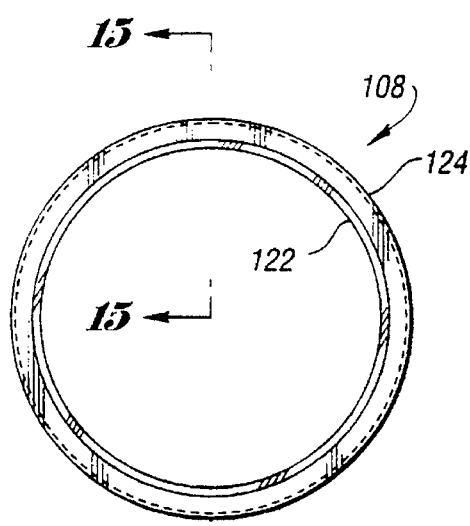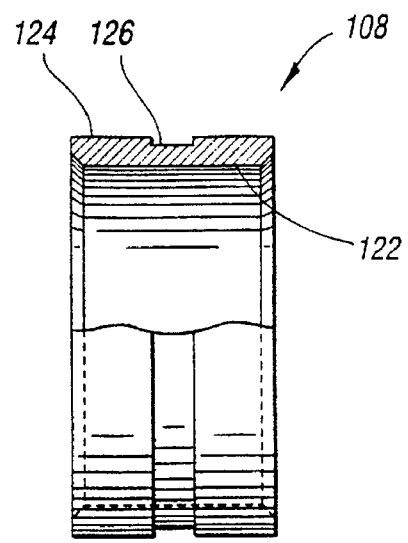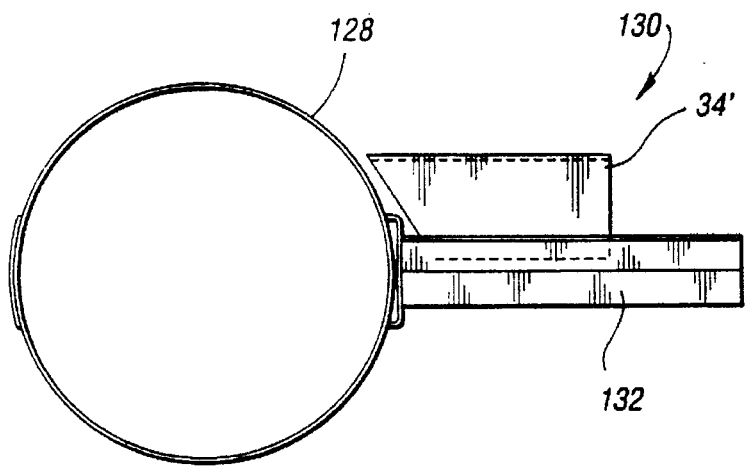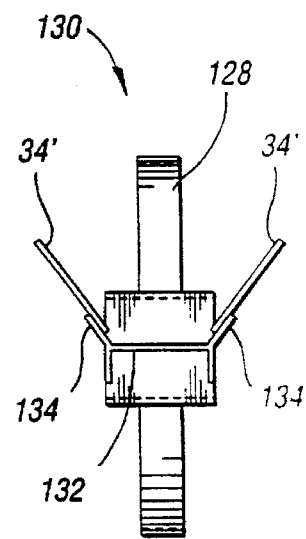
Fig. 14   Fig. 15
Fig. 16   Fig. 17

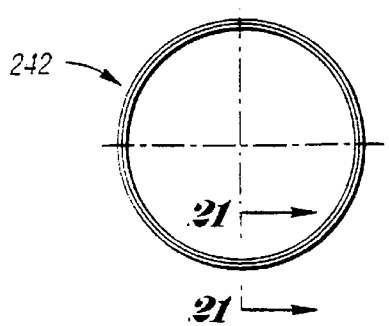
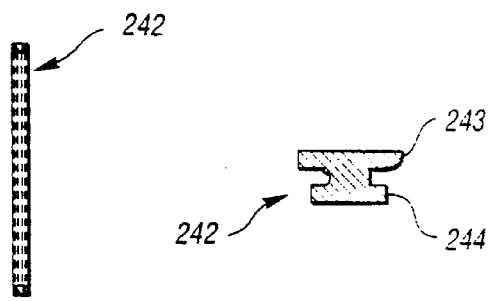
Fig. 20  Fig. 21  Fig. 22
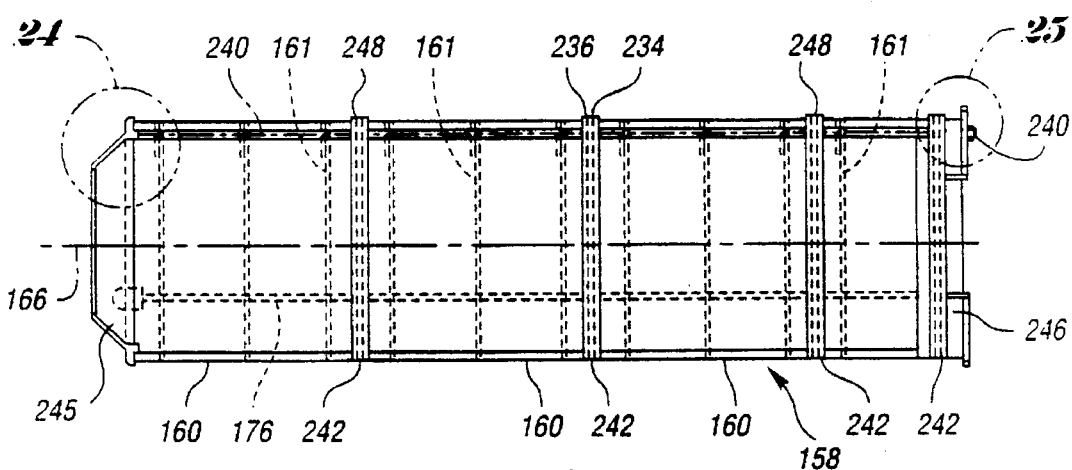
Fig. 23
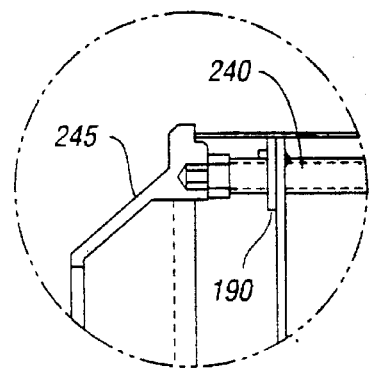
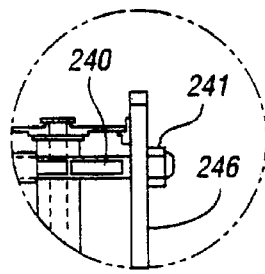
Fig. 24  Fig. 25

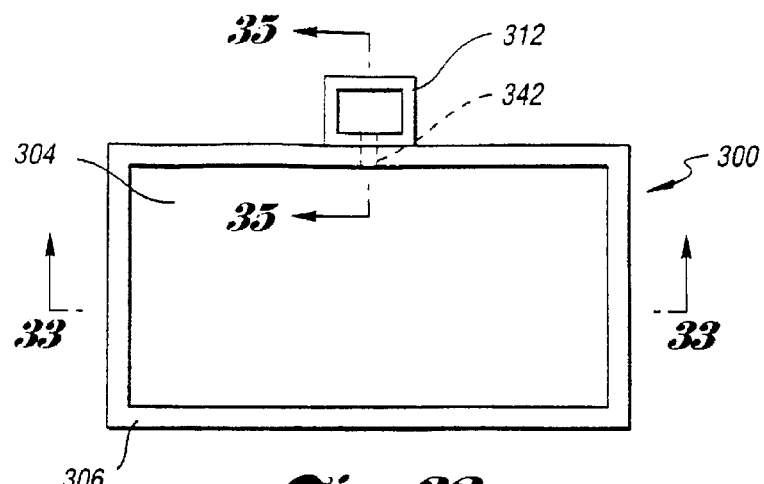
Fig. 32
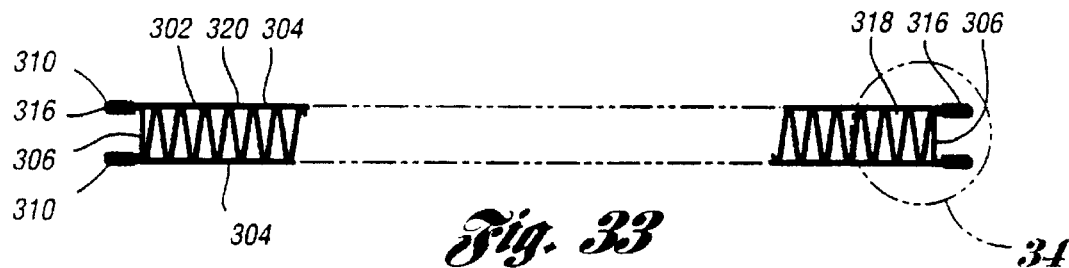
Fig. 33
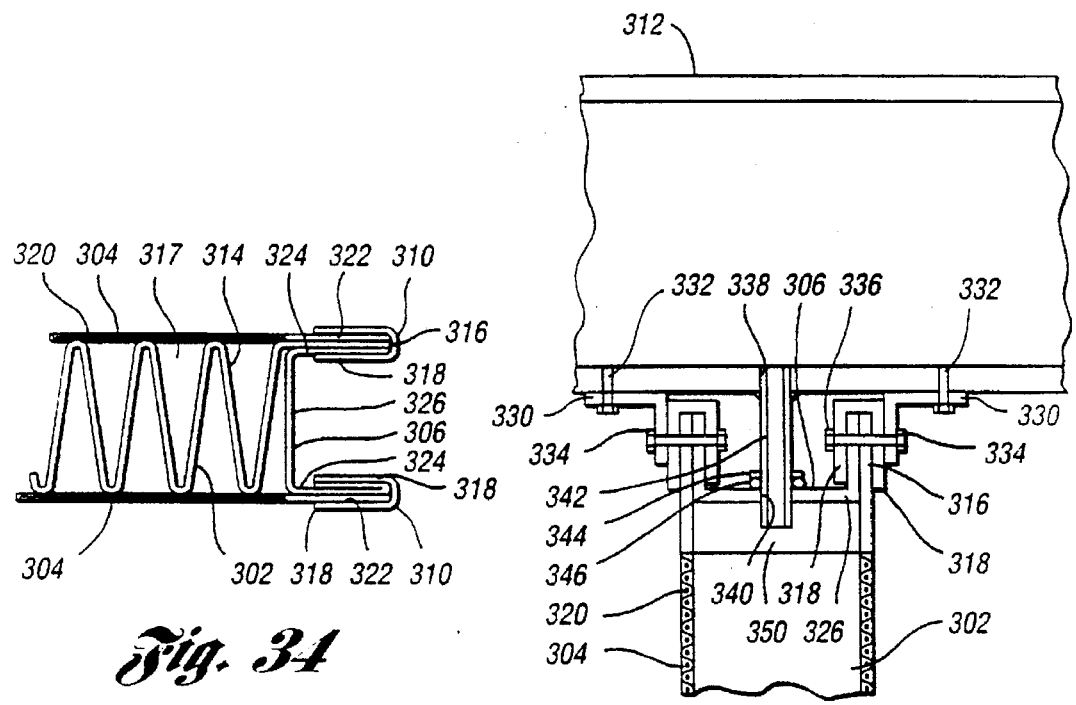
Fig. 34
Fig. 35

IMMERSIBLE FILTER DRUM UNIT AND METHOD FOR ASSEMBLING THEREOF

CROSS-REFERENCE TO RELATED APPLICATION

This application is a continuation-in-part of U.S. patent application Ser. No. 07/967,196, entitled Filter Apparatus for Machine Tool Coolant, filed Oct. 27, 1992, now U.S. Pat. No. 5,389,256, which in turn, is a continuation-in-part of U.S. patent application Ser. No. 07/575,338, filed Aug. 30, 1990, which is now U.S. Pat. No. 5,158,691, issued Oct. 27, 1992.

TECHNICAL FIELD

This invention relates to filters for filtering industrial liquids such as machine tool coolants, and more particularly, to an immersible drum or disc filter apparatus for filtering contaminants onto a foraminous surface.

BACKGROUND ART

Conventional filter apparatus utilized in machine tool operations of the type described in U.S. Pat. Nos. 4,507,061 and RE 32,135 separate machine tool chips and other contaminants from coolant so that clean coolant may be returned to the machine tools for reuse. Often times, the contaminants are very small and of an elongated shape. Usually one or more horizontally disposed filter drums are located adjacent the bottom of a settlement tank. A suction is provided by a pump to the interior of the filter drum to pull coolant through the filter element to move the coolant from one side of the filter to the other. Filter cake, comprised of small chips and other contaminants, is formed on the outside of the drum surface. The drum is periodically indexed to enable a doctor blade to scrape off a portion of the accumulated filter cake, which drops to the bottom of the tank for removal by a dragout conveyor.

The conventional filter element is comprised of a continuous length of wedge shaped wire wrapped around a drum-shaped support. The filter element thereby includes elongated openings through which some elongated contaminants are allowed to pass if the contaminants are aligned in the direction of fluid movement as they strike the filter. The passage of these elongate contaminants allows the contaminants that pass through the filter to be recirculated to the machine tools.

An alternate type filter system that has been tried is fabricated from rectilinear mesh, wire cloth or the like. Although the minute square openings formed by the woven wire cloth are effective in preventing the passage of elongate contaminants, the surface is not a flat planar surface and thus becomes clogged when scrape cleaning is attempted.

In drum-type filters, a thin screen element or microscreen with tiny perforations therethrough are often mounted on a drum-shaped support cylinder. The support cylinder has moderately sized holes. Fluid filters through the perforations in the screen element and then through the holes of the support cylinder to reach the interior of the filter drum.

The screen element often begins as planar rectangular sheet. The sheet is pulled taut about the support cylinder and then ends of the sheet are joined to form a seam holding the screen element tautly about the support cylinder. However, when the seam is repeatedly scraped by doctor blades, the screen element can become worn and tear. Also, the screen element can often be manufactured more inexpensively as an endless cylinder or tube as compared to starting with a planar sheet and then joining ends together to form a closed cylinder or tube with a seam.

Disc filter elements may comprise many components. First, a central frame is provided to support the disc filter element. Next, screen support structures often are sandwiched about the central frame. Perforated screen elements are placed over the screen support structures. Finally, these components are joined together by a retainer.

The screen support structures are important in that they provide support to screen elements to prevent the screen elements from becoming overstressed and tearing while still allowing for proper fluid flow through the disc filter element. This is particularly true for very thin screen elements. However, by increasing the number of components in the disc filter element, such as by adding screen support structures, the cost and complexity of making the disc filter element also increases. Further, the filter support structures can become a serious impediment to fluid flow if not properly designed.

Therefore, there is a need for a simple, inexpensive disc filter element which can be used with thin screen elements and which has relatively few parts while providing adequate support to the screen elements.

DISCLOSURE OF INVENTION

An object of the present invention is to provide an improved filter apparatus for filtering industrial liquid such as machine tool coolant.

A further object of the invention is to provide an improved filter apparatus having a filter that provides improved scrape-cleanability of the filter surface.

A still further object of the invention is to provide a filter element that prevents movement of machining chips, particulate and also elongate contaminants found in machine tool coolant from one side of the filter to the other side.

Another object of the invention is to provide an improved disc filter assembly that is easy to assemble and disassemble for repair and maintenance.

Yet a further object is to provide a filter drum unit which utilizes a closed cylindrical screen element mounted upon a variable diameter perforated support plate so that the tautness of the cylindrical screen element may be readily adjusted. Individual filter drum units can be joined together to form an elongate filter drum assembly.

Still yet another object is to provide a disc filter assembly having a hollow mandrel with inexpensive disc filter elements mounted thereon, each disc filter element having a unitary molded plastic inner structure with closely spaced ribs supporting adjacent screen elements and forming flow channels between the supporting ribs thereby allowing easy fluid flow through the disc filter element while providing satisfactory support to the screen elements.

Also, it is an object to provide a disc filter assembly having a hollow mandrel with a plurality of rectangular disc filter elements mounted thereon; the disc filter elements utilize folded or pleated rectangular inner metal structures which can be inexpensively made and which are used to support screen elements while providing good fluid flow admittance through the disc filter elements.

In carrying out the above objects and other objects of the invention, a filter drum unit for filtering contaminants from a fluid and extending along a longitudinal axis is disclosed. The filter drum unit includes a generally cylindrically-shaped open perforated support plate, a closed cylindrical flexible screen element and a circumference varying mechanism. The support plate is generally concentric with the longitudinal axis and has first and second longitudinally extending ends. The support plate is elastically deformable to vary its circumference. The cylindrical screen element surrounds and is radially supported by the support sheet. The circumference varying mechanism is used to vary the circumference of the support plate. The circumference of the support plate can be reduced so that the screen element may be placed over the support sheet and then expanded to place the screen element in a taut relationship about the support plate.

Preferably, the screen element is seamless. Ideally, the circumference varying mechanism includes a turnbuckle connected relative to the support plate to vary the circumference of the support plate. Further, it is desirable to provide a coupling segment having an aperture therein which receives a tie rod. Accordingly, a plurality of such filter drum units can be clampingly joined together by tie rods to form a filter drum assembly.

As an alternative to using an immersible filter drum assembly, a disc filter assembly may be used. In one preferred embodiment, the disc filter assembly includes disc filter elements which are fluidly mounted on an evacuating mandrel. Each disc filter element comprises an inner support structure, a screen element and a retainer. The inner support structure has an inner periphery, an outer periphery and a plurality of ribs forming a plurality of flow channels therebetween. The flow channels connect with the inner periphery of the inner support structure which is mounted on the hollow mandrel. The screen element is supported upon the ribs and extends over the flow channels. The retainer holds the screen element to the outer periphery of the inner support structure to prevent contaminants from passing therebetween. The ribs are sufficiently close to one another such that the screen element extending across the grooves will not tear while permitting fluid to filter through the screen element and into the channels so that the fluid may be evacuated into the hollow mandrel.

Alternatively, a disc filter assembly may be used which has rectangular disc filter elements fluidly mounted along a hollow evacuating mandrel. Each rectangular disc filter element comprises a rectangular inner structure, a rectangular screen element and a retainer. The rectangular inner structure is pleated having a plurality of longitudinally extending folds arranged in an accordion-like manner. The folds have transverse portions connected by the bend or bight portions. The rectangular screen element is supported upon the bend portions of the inner structure. The inner structure folds and the screen element create a plurality of longitudinally extending channels. The retainer retains the screen element against the inner structure to prevent contaminants from passing between the screen element and the inner structure. Ideally, the inner structure is made from a thin sheet of metal which is readily foldable into the accordion-like shape.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a perspective partial view of a disc filter assembly substitutable for the filter drum assembly in the filter system of FIG. 1;

FIG. 5 is a sectional plan view taken along lines 5—5 in FIG. 4 of a disc filter element of the disc filter assembly illustrating communication of the machine tool coolant;

FIG. 6 is an exploded planar view taken along arrow 6 in FIGS. 3 and 5 illustrating a section of a first embodiment of the foraminous non-reticulated surface of the filters of the present invention;

FIG. 7 is a cross-sectional view taken along lines 7—7 in FIG. 6;

FIG. 8 is an exploded planar view like FIG. 6 illustrating a second embodiment of the foraminous non-reticulated surface of the filters of the present invention;

FIG. 9 is a cross-sectional view taken along lines 9—9 in FIG. 8;

FIG. 12 is a partial elevational view of an elastomeric endless retainer;

FIG. 13 is a sectioned view of the endless elastomeric retainer taken along lines 13—13 in FIG. 12;

FIG. 14 is an elevational view of a spacer element for spacing the disc filter elements on the hollow mandrel;

FIG. 15 is a partial sectional view of the spacer element of FIG. 12 taken along lines 15—15 in FIG. 14;

FIG. 16 is a side view of a scraper blade assembly mountable on the spacer element;

FIG. 17 is a plan view of the scraper blade assembly of FIG. 16;

FIG. 20 is a front elevational view of a splicer used to join drum units together;

FIG. 21 is a side elevational view of the splicer of FIG. 20;

FIG. 22 is an enlarged cross-sectional view taken along line 21—21 of FIG. 20;

FIG. 23 is a side elevational view of a filter drum including a plurality of drum units;

FIG. 24 is an enlarge view of the encircled area 24 of FIG. 23;

FIG. 25 is an enlarged view of the encircled area 25 of FIG. 23;

FIG. 32 is a front elevational view of a rectangular filter element;

FIG. 33 is a sectional view taken along line 33—33 of FIG. 32;

FIG. 34 is an enlarged fragmentary view of encircled area 34 of FIG. 33 and

FIG. 35 is a fragmentary sectional view taken along line 35—35 of FIG. 32 showing the rectangular disc filter element fluidly mounting to an evacuating mandrel.

BEST MODE FOR CARRYING OUT THE INVENTION

Figure 1:
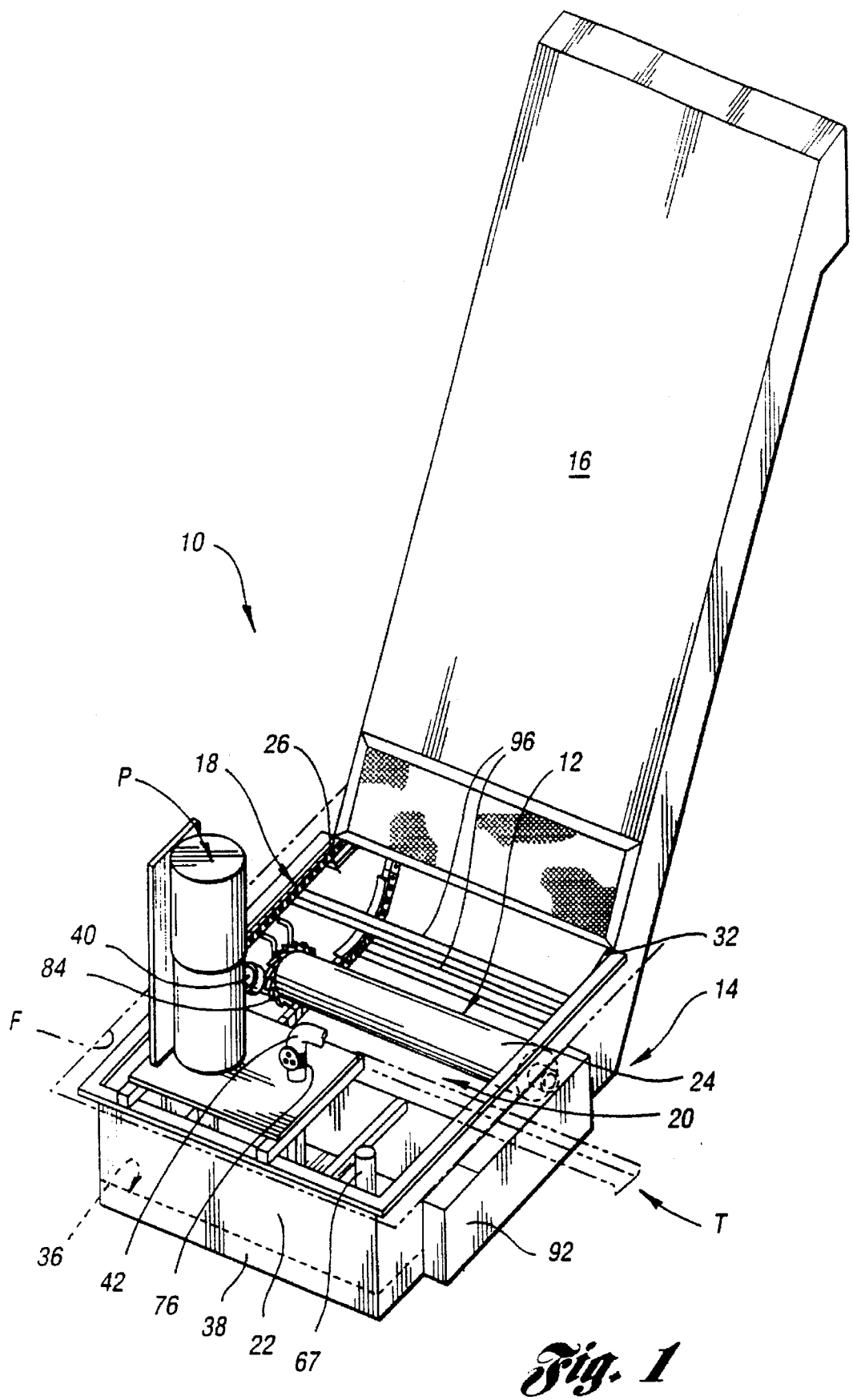
FIG. 1 is a perspective view of a filter system including a removable filter drum having a non-reticulated foraminous surface constructed in accordance with the present invention.

With reference to FIG. 1 of the drawings, a filter apparatus for filtering machine tool coolant, constructed in accordance with the present invention, is generally indicated by reference numeral 10. As is hereinafter more fully described, apparatus 10 includes a filter assembly 12 which is easier to keep clean and which prevents machining chips, particulate as well as elongate contaminants in the coolant, from being recirculated to the machine tools.

Referring again to FIG. 1, a settling tank 14 is set into a pit disposed below the floor level or elevation F in an industrial environment. Tank 14 is generally rectilinear in configuration and has a sloping end wall or ramp 16 for use in conjunction with a dragout conveyor 18. Tank 14 is comprised of two discrete compartments; a dirty or contaminated coolant compartment, designated 20, for receiving dirty coolant from trough T in communication with the machine tools, also not shown; and a clean coolant compartment 22 for receiving clean filtered coolant from tank 14.

Figure 3:
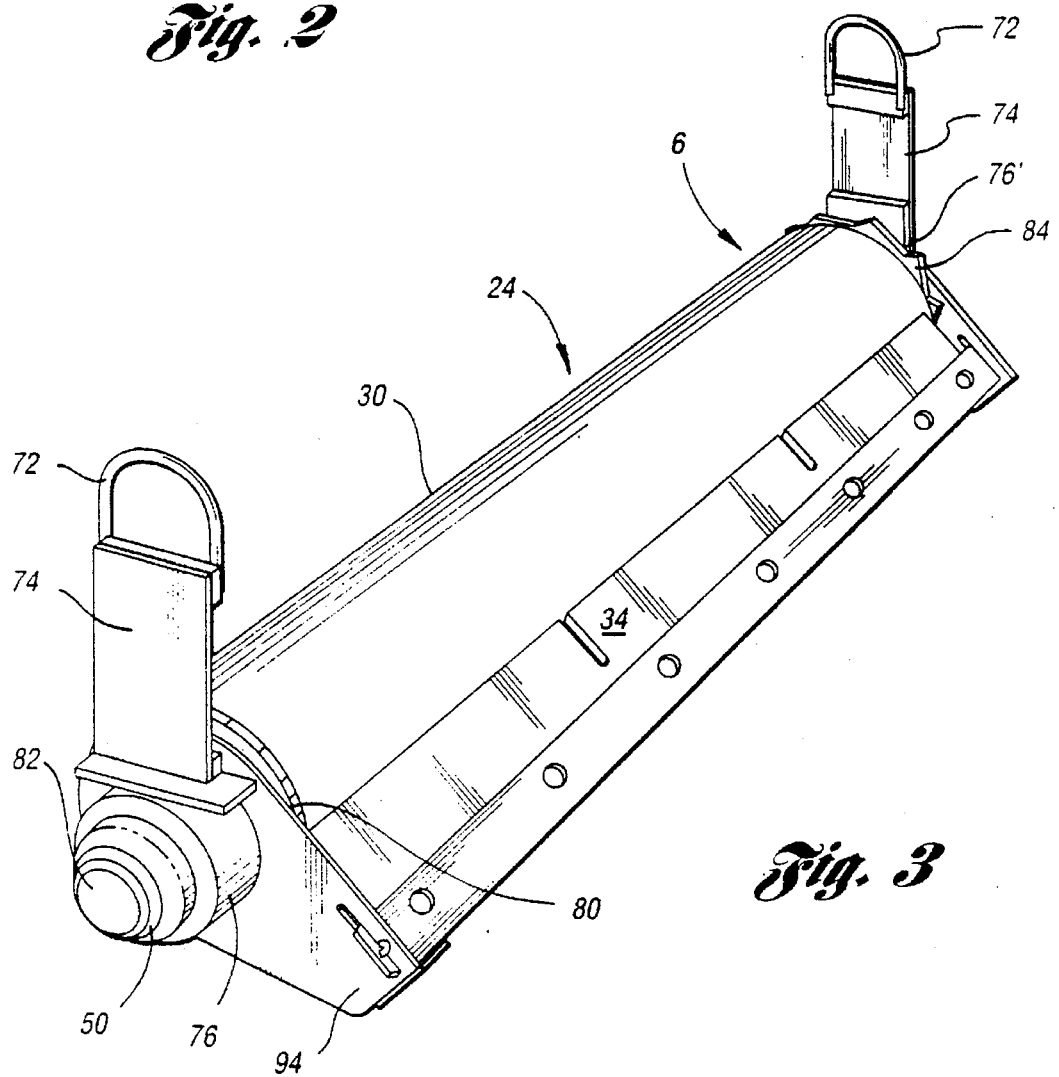
FIG. 3 is a perspective view of the filter drum assembly.

Within dirty coolant compartment 20, there is provided a horizontally disposed filter drum assembly 24 between two parallel sides 26,28 of tank 14 for filtering the dirty coolant whereby clean coolant filtrate may be supplied to machine tools as explained hereinafter. Preferably, filter drum 24, as best seen in FIG. 3, has a foraminous surface 30 comprised of a non-reticulated metal screen having minute openings 32, as best seen in FIGS. 6–9, and a smooth planar surface. Minute openings 32 are preferably in the range between 50 and 250 microns in diameter and most preferably 250 microns. In a first configuration, shown in FIGS. 8 and 9, minute openings 32 in the direction of coolant movement are conical, tapering outwardly. In a second configuration, shown in FIGS. 6 and 7, minute openings 32 in the direction of coolant movement are hourglass in shape.

During operation of the filter apparatus 10, filter drum 24 collects a filter cake composed of machining chips (particulate including elongate contaminants) from machine tool operations about its surface 30. Coolant is moved through the filter cake and surface 30 of the filter drum 24 into the interior of the drum. More particularly, a suction is drawn on the inside of drum 24 by pump P. Coolant in dirty filter tank compartment 20 thus passes through the filter cake and drum, and cleaned or filtered coolant is supplied by the pump P to the machine tools.

Dragout conveyor 18 is conventional in construction and serves to remove both the solids settled out from the coolant and the filter cake removed from the filter drum 24 by a doctor blade 34 shown in FIG. 3, both of which settle to the bottom of tank compartment 20. Doctor blade 34 comprises a non-abrasive material, preferably a flexible plastic material, having a leading edge flexed to contact the surface 30 in a tangent relationship whereby the surface is easily cleaned. The solids removed from the bottom of the tank compartment 20 by conveyor 18 are deposited in a suitable receptacle, not shown, at the end of the conveyor. For present purposes, it will be appreciated that clean coolant is supplied from the interior of the one or more filter drums 24 to the machine tools by operation of the pump P hereof. Clean coolant compartment 22 includes an elevated or false floor 36 above the lower tank wall bottom and which defines a lower chamber 38 for receiving clean coolant from the suction side of filter drum via conduit 40.

Disposed in clean compartment 22 is a main outlet conduit 42 for connection with the machine tools. Thus, clean coolant is supplied the machine tools from the suction side of filter 24 by way of chamber 38, pump P and outlet conduit 42. The purpose of clean coolant compartment 22 is to provide a reservoir of clean coolant which can be supplied the machine tools when the filter drum 24 is indexed for cleaning. Thus, a valve, not shown, is opened affording communication between the clean coolant in chamber 38 and the clean coolant in the remainder of clean coolant compartment 22 above floor 36. In this manner, pump P suction is applied to the clean coolant in compartment 22 to supply coolant to the machine tools. The suction is also removed with respect to the inside of the filter drum assembly 24 to facilitate cleaning filter cake from the outside surface of the drum. Upon closing this valve, pump suction to the filter drum is reestablished, as will become clear from the ensuing description.

Figure 2:
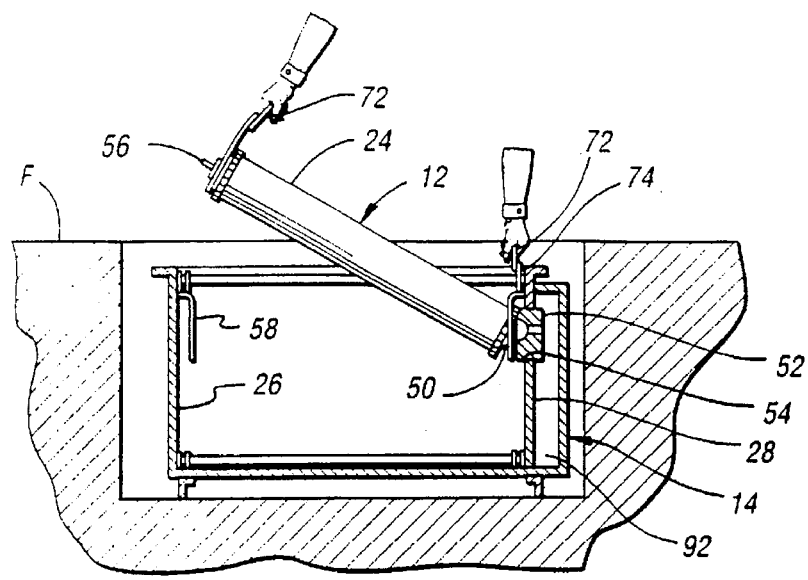
FIG. 2 is a sectional partial plan view of the filter system of FIG. 1 illustrating the removability of a filter drum assembly.

Referring now to FIGS. 2 and 3, filter drum 24 is shown to have axial extensions at each end, one end comprising a ball duct joint 50, the socket 52 of which is placed in an aperture 54 in the side wall 28 of tank 14; and the other end of which filter 24 is provided with a spring axially outwardly pressed cap or pin 56 which, in the position shown, has an over-all length greater than the distance between the wall 26 and the base of the socket 52 as shown. Thus, when the filter assembly 24 has its ball duct joint 50 placed into the socket 52 guided by the U-shaped bracket 58, the other end may have its pin 56 pressed against the wall 26 of the tank 14 so that a resilient means, which may be a compression spring inside an axially aligned sleeve in the filter drum 24, will urge the whole assembly 24 and its ball duct 50 into sealing engagement with the socket 52 anchored in the opposite parallel wall 28 of the tank 14. Since it is not possible to lift the ball duct 50 vertically out of its socket 52 in order to remove the filter drum assembly 24, the opposite end with pin 56 must be lifted first as shown in FIG. 2 so that ample space above the tank 14 is had to remove the ball duct 50 from socket duct 52.

Similarly, in installing the filter drum assembly 24, the same procedure must be followed. If desired, the ends of the filter drum assembly 24 may be provided with lifting handles 72 as shown in FIGS. 2 and 3, in which event it is necessary that the connections 74 between each handle 72 and the non-rotatable bearing ends 76 and 76' should be inwardly directed or flexible plates to permit clearance from the side walls 26 and 28 as shown particularly at the right end of the filter 24.

In a first arrangement of filter apparatus 10 shown in FIGS. 1–3, the filter assembly 12 is a filter drum assembly 24 having foraminous non-reticulated metal screen surface 30 providing the filtering. An end disc 80 is centrally apertured and may be integral through a hollow hub portion 82 with the ball duct 50. Another end disc 84 is also communicable with hollow hub portion 82 and may be peripherally serrated to form a ratchet wheel engageable by a drive means, not shown, for rotating the filter assembly 12 for cleaning.

In a second arrangement of filter apparatus 10, the filter drum assembly 24 shown in FIGS. 1 and 2 is replaced by disc filter assembly 24', shown partially in FIGS. 4 and 5. Filter assembly 24' is a disc filter assembly comprising a plurality of hollow disc filter elements 88 spaced along and in communication with hub portion 82 which can, in number, increase the filter surface area as compared to a filter drum of the same volume. Each disc filter element 88 includes the same foraminous surface 30 and an adapted doctor blade 34' for scraping the surface. As seen in FIG. 5, coolant is communicated through surface 30 of disk filter 88, whereby machining chips, particulate as well as elongated contaminants form a filter cake on the surface, and is passed through the hollow disc and into hub 82.

In either construction, clean liquid which passes through the surface 30 can flow unobstructedly out through the apertured end disc 80 and hub 82, ball duct 50 and socket duct 52 into a suction duct 92 which may comprise a separate chamber on the outside of the wall 28 of the settling tank 12.

The stationary bearing means 76 and 76' are provided with radially outwardly extending flanged wing portions 94 for adjustably supporting the flexible plastic scraping or doctor blades 34,34' against the outer filter surface 30. The non-abrasive doctor blades 34,34' remove the fine solid particles that accumulate and form a filter cake on the foraminous non-reticulated surface 30 when the filter 24,24' is indexed at intervals by the drive means. During this operation, the suction in duct 92 is reduced to aid in allowing the removed particles to settle and be carried out by flights 96 of the conveyor.

Figure 10:
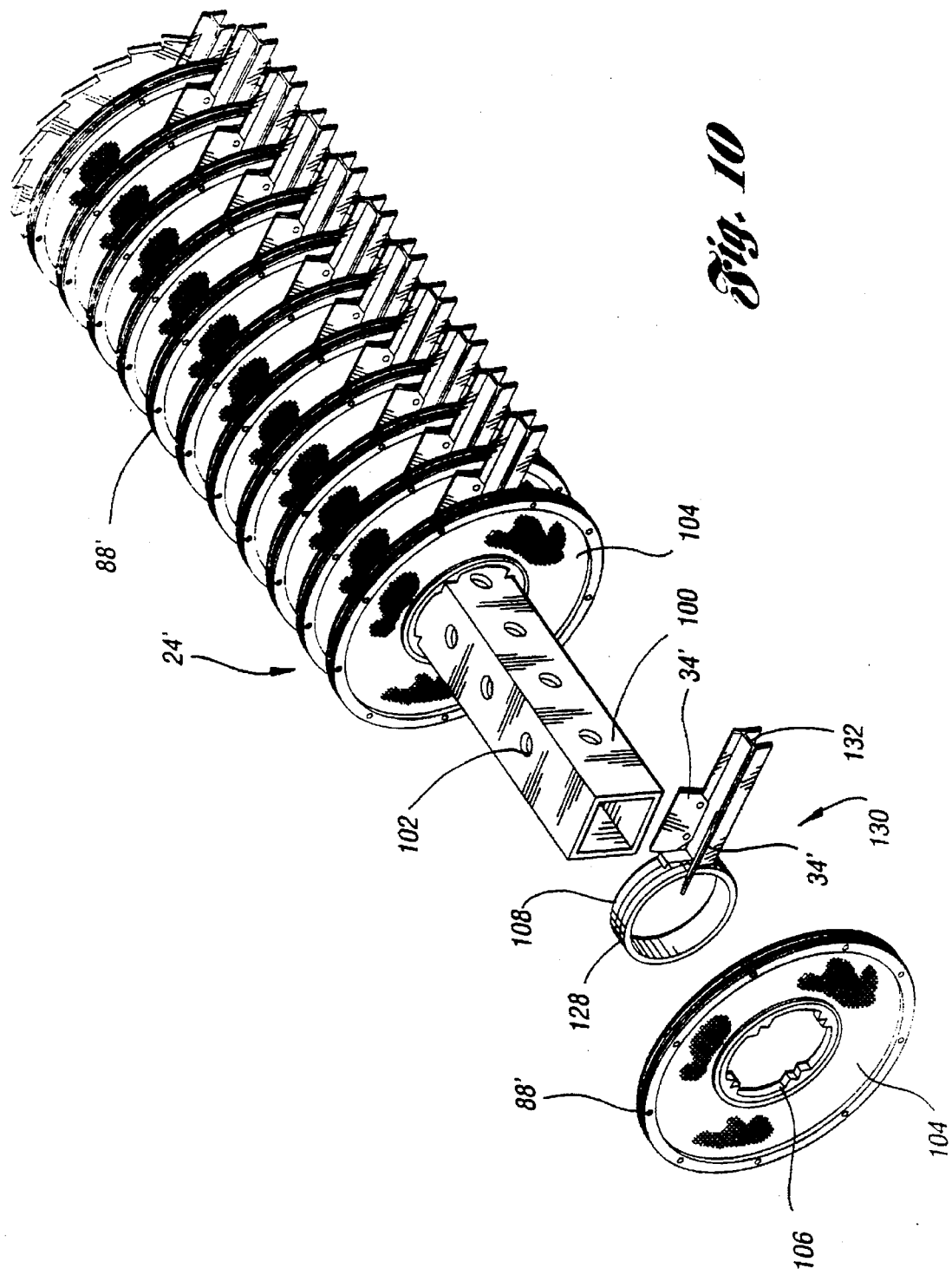
FIG. 10 is a perspective view of an immersible disc filter apparatus constructed in accordance with the present invention illustrating a hollow mandrel and a plurality of disc filter elements removably mounted thereon.

FIGS. 10-15 illustrate in greater detail disc filter assembly 24'. Referring to FIG. 10, the immersible disc filter assembly 24' includes a hollow rotatable mandrel 100 of predetermined cross-sectional shape. Herein, the mandrel 100 is shown having a rectangular cross-sectional shape although other shapes are equally functional. Hollow mandrel 100 also includes perforations 102 through which the machine tool coolant is movable. Disc filter assembly 24' includes a plurality of hollow disc filter elements 88'. Each filter element 88' has a filter portion 104 for receiving the machine tool coolant into the hollow of the filter element. Each filter element 88' also has a hub portion 106 of a cross-sectional shape configured to key to the predetermined cross-sectional shape of the mandrel 100. The keying feature of the disc filter elements 88' to the mandrel 100 provides a driven relationship of the disc filter element 88' by the mandrel 100.

The filter elements 88' are spaced along the hollow mandrel 100 and are located on the mandrel to place the hollow of each filter element 88' in machine tool coolant fluid communication with the hollow of the mandrel through at least one of the perforations 102.

A plurality of spacer elements 108 are relatively rotatably mounted on the mandrel 100. Each spacer element 108 functions to space the filter elements 88' along the mandrel 100 and also to provide a bearing surface for supporting a scraper blade assembly for relative rotation with respect to the mandrel.

Figure 11:
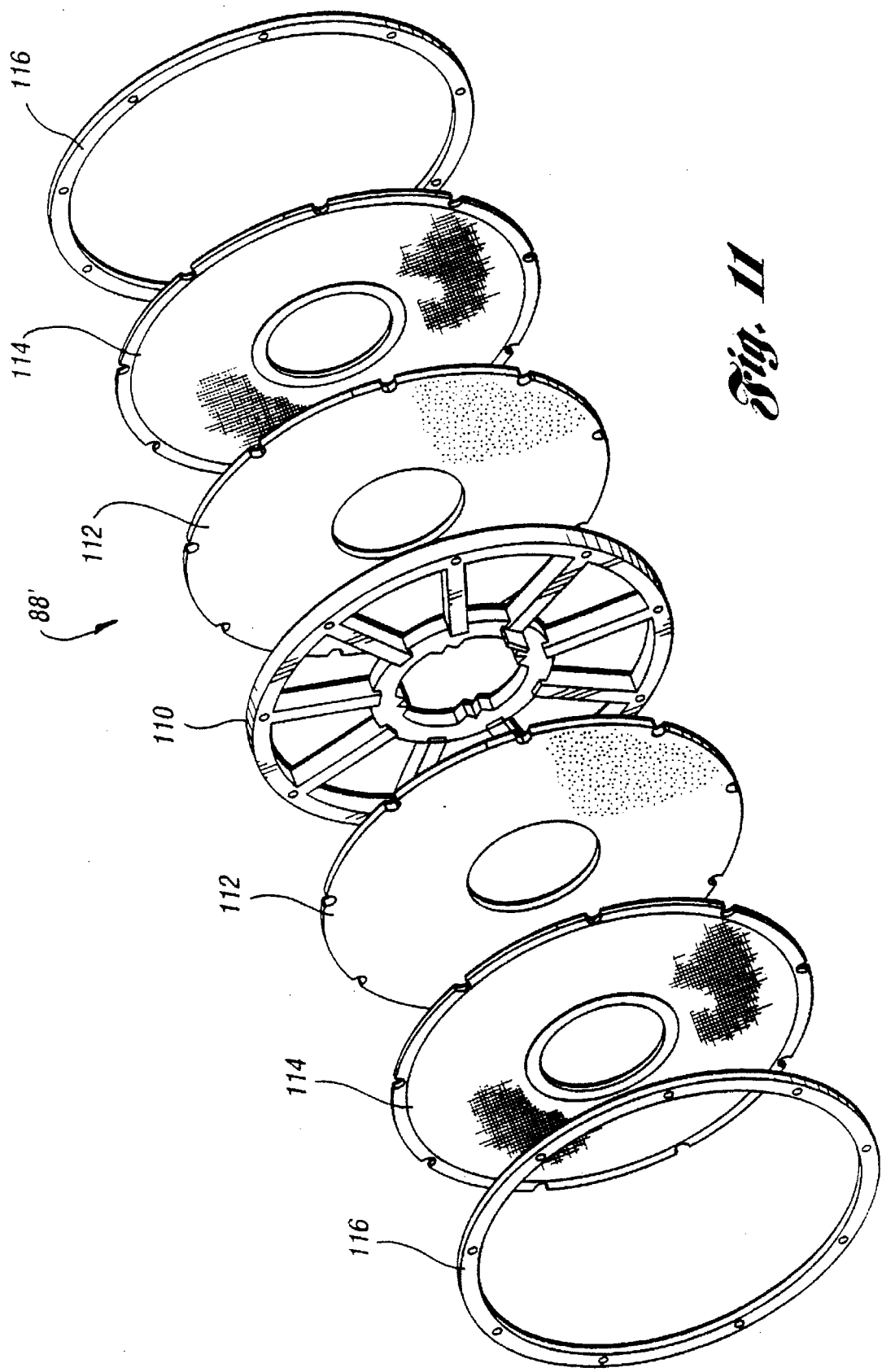
FIG. 11 is an exploded perspective view of a disc filter element illustrating a frame, filter backing elements, filter elements and retainer.

With reference to FIG. 11, each disc filter element 88' includes a frame element 110, a filter backing element 112, a filter element 114 and a retainer 116. The retainer 116 retains in sandwich fashion the frame 110, filter backing element 112 and filter element 114. Illustrated is a two-sided filter element 88' which maximizes filter surface area although the disc filter element can be made one-sided.

With further reference to FIG. 11, the retainer 116 is a rigid retaining ring fastenable about the periphery of each of the filter elements 114 and filter backing element 112 to mount the same on the frame element 110.

With reference to FIGS. 12 and 13, a preferred retainer 116' is illustrated. Retainer 116' is an endless elastomeric member having inner and outer circumferential surfaces 118 and 120. The inner circumferential surface 118 is of a generally concave cross-sectional shape as illustrated in FIG. 13. The endless elastomeric retainer 116' allows the retainer to be stretched over the filter elements 114 and filter backing elements 112 and frame element 110 to bias the same together in urged engagement. This allows the filter elements 114 to be changed quite quickly although use of a rigid retainer 116 as in FIG. 11, may sometimes be more appropriate.

Referring now to FIGS. 14 and 15, the spacer element 108 is a sleeve having inner and outer surfaces 122, 124. The outer surface 124 of the sleeve includes a circumferential groove 126 to mount a bearing 128 on which the scraper blade assembly 130 is mounted. Spacer element 108 allows for relative rotation between the scraper blade assembly 130 and mandrel 100. For simplicity in construction, a steel band has been used as the bearing 128. However, many types of bearings are contemplated for use in the invention.

FIGS. 16 and 17 illustrate scraper blade assembly 130. Scraper blade assembly 130 includes an arm 132 mountable on bearing 128. In the construction illustrated, arm 132 is welded onto bearing 128. Arm 132 includes a mounting portion 134 for replaceably mounting a doctor blade 34' on the arm. As best seen in FIG. 17, mounting portion 134 is angled outwardly so that a doctor blade 34' mounted thereon strikes the surface of filter element 114 at an acute angle. As the mandrel 100 is rotated, the filter element 114 is likewise rotated into the leading edge of doctor blade 34' to scrape collected contaminant of filter element 114.

Each doctor blade 34' can be easily replaced on arm 132 such as by welding or fastening with a threaded fastener or riveting. Also, it can be appreciated that the material used for doctor blade 34' will be dependent on the industrial liquid filtered, nature of contaminant, speed of operation, etc. Although each scraper blade assembly 130 is illustrated with two doctor blades 34' for scraping adjacent surfaces of two side-by-side filter elements 114, only one doctor blade 34' is required at the outer ends of mandrel 100.

FIG. 23 shows drum filter 158 which is comprised of adjacent individual drum units 160. A plurality of such filter drum units 160 can be secured together to form elongate filter drum 158. In the preferred embodiment, the approximate axial length of each drum unit 160 is three feet and the diameter is two feet.

Figure 18:
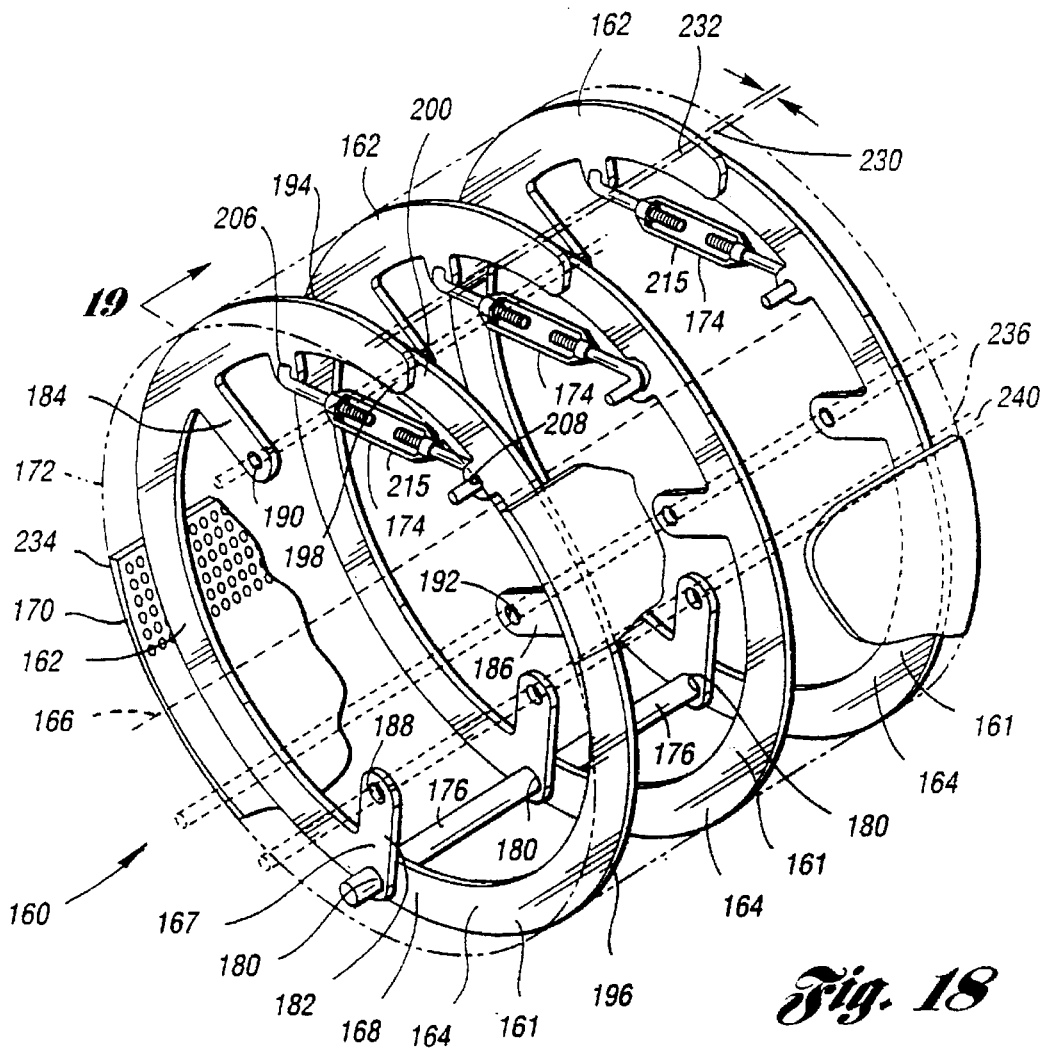
FIG. 18 is a perspective view, partially in cutaway, of a filter drum unit.
Figure 19:
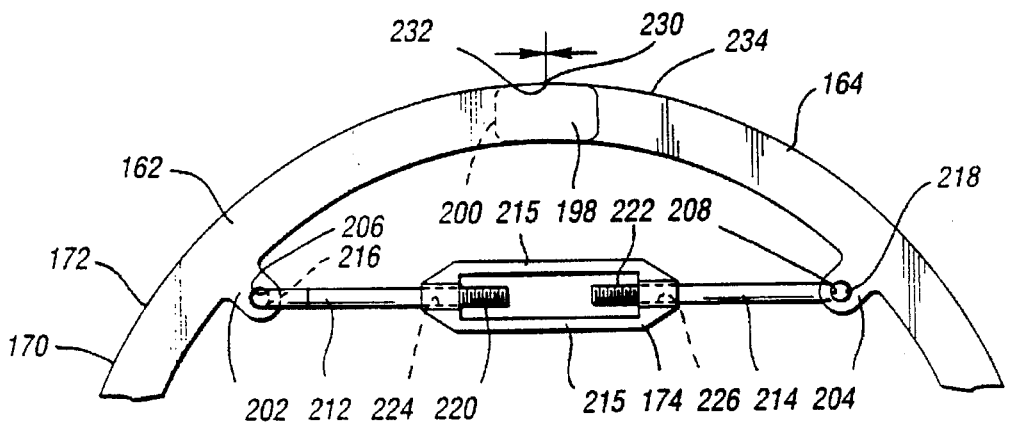
FIG. 19 is a partial front elevational view of a turnbuckle adjustably connecting the ends of a pair of overlapping arms of the drum.

As seen in FIGS. 18–19, each drum unit 160 in the preferred embodiment, comprises a set of three support rings 161 each having first and second arcuate arms 162 and 164 spaced along a longitudinal axis 166. Drum unit 160 further comprises a curved perforated support plate 170, preferably an endless tube of flexible microscreen 172 mounting over support plate 170, turnbuckles 174 and a pivot axle 176. Arcuate arms 162 and 164 pivot about pivot axle 176 to expand and contract their outer peripheries, which in turn, expand and contract the circumference of support plate 170. This allows the endless tube of microscreen 172 to be placed over support plate 170 when support plate 170 is in a contracted state. Later, arcuate arms 162 and 164 and support plate 170 can be expanded to place microscreen 172 into a desired tautness or tensioned state.

Arcuate arms 162 and 164 each include a pivot aperture 180 for receiving pivot axle 176 therethrough. Radially inwardly extending appendages 182 and 184 are located on first arm 162 and a corresponding appendage 186 extends radially inwardly from arm 164. Each of appendages 182, 184 and 186 have respective apertures 188, 190 and 192 adjacent their radial inner ends. Preferably, appendages 182, 184 and 186 are spaced circumferentially 120° apart. On the outside of arcuate arms 162 and 164 are generally semicircular extending support surfaces 194 and 196. Distal ends 198 and 200 of respective arcuate arms 162 and 164 preferably overlap one another. Adjacent each of distal ends 198 and 200 are radially inwardly extending members 202 and 204 which have respective apertures 206 and 208.

Referring to FIG. 19, each of turnbuckles 174 have a pair of hooked segments 212 and 214 threadedly attaching to a central handle 215. Segments 212 and 214 have hooked ends 216 and 218 and threaded ends 220 and 222. Hooked ends 216 and 218 are received into apertures 206 and 208 of members 202 and 204. Threaded ends 220 and 222, one of which has right handed threads and the other of which has left handed threads, are received into threaded bores 224 and 226 of handle 215.

Microscreen 172 is ideally seamless. Tubes or cylinders formed by joining ends of a rectangular sheet of microscreen will have seams. These seams can be snagged by doctor blades. Accordingly, it is preferable to use seamless or endless microscreens. A preferred material for microscreen 172 is Veroscreen which is available from Stork Veco International of Brookline, MA. Ideally, microscreen 172 has apertures which are of an hourglass shape and have a diameter in the range of 0.005–0.012", and most preferably 0.010". This screen is made in a Nickel plating process which is conducive to making the microscreen seamless.

A second preferred microscreen is a stainless steel microscreen which is made by etching stainless steel. The product is made and sold by Buckbee-Mears of Minneapolis, Minn. This particular microscreen has ends which are seamed together.

Support plate 170, initially a planar rectangular sheet, is permanently deformed into a generally open cylindrical shape. Support plate 170 has first and second longitudinally extending end surfaces 230 and 232 which are shown abutting one another in FIG. 19. Also, support plate 170 has longitudinally spaced and circumferentially extending end surfaces 234 and 236. End surfaces 234 and 236 on adjacent drum units 160 abut one another when drum filter 158 is constructed.

In operation, the sets of first and second arcuate arms 162 and 164 forming rings 161 are axially spaced from one another and are placed within support plate 170. Pivot axle 176 extends through pivot apertures 180 and connects rings 161. Rings 161 are periodically spot welded along their circumference to support plate 170. In the preferred embodiment, three sets of axially spaced arms 162 and 164 are used in each of the filter drum units 160. However, two or four or more longitudinally spaced sets could also be used to construct filter drum units of varying length.

Turnbuckles 174 are connected to apertures 206 and 208 in each of the sets of arms 162 and 164. Turnbuckles 174 are then adjusted such that the arcuate rings 161 are sufficiently contracted so that longitudinally extending end surfaces 230 and 232 overlap providing a reduced outer diameter to support plate 170. This allows microscreen 172 to slide over the outer periphery of support plate 170. Turnbuckles 174 are then adjusted using handles 216 to expand the length of turnbuckles 216 thereby pivoting the distal ends 198 and 200 of arcuate arms 162 and 164 apart.

Ideally, arcuate arms 162 and 164 and support plate 170 are sufficiently circumferentially expanded such that end surfaces 230 and 232 of support plate 170 are no longer overlapped and snap into abutting relationship forming a smooth interface as shown in FIG. 19. At this point, microscreen 172 should be sufficiently tensioned such that it will be taut upon support plate 170. Frictional engagement between microscreen 172 and support plate 170 will keep microscreen 172 in place. However, if necessary, spaced apart welds may be used to tack microscreen 172 to support plate 170.

Referring now to FIGS. 20–25, to create a drum filter 158 of a desired length, a number of the filter drum units 160 are placed end to end and clampingly held together using tie rods 240. Between each of adjacent filter drum units 160 is placed an annular splicer ring 242 which is I-shaped in cross-section as shown in FIG. 22. Splicer ring 242 is made by welding an annular web between a pair of annular rings. Splicer ring 242 has inner and outer flanges 243 and 244 which sandwich about end surfaces 234 and 236 of support plate 170.

A curved seal bearing casting 245 and an end ratchet plate 246 are attached at the opposing ends the drum units 160. Seal casting 245 has threaded sockets for receiving the end of tie rods 240 and nuts 247 are used to clamp against end ratchet plate 246.

Tie rods 240 pass through the respective coaxially aligned apertures 188, 190 and 192 in each of filter drum units 160 and are threaded into the threaded sockets of seal bearing casting 245. Threaded fasteners 241 are placed on the ends of tie rods 240 to clamp the individual filter drum units 160 axially together. End surfaces 234 and 236 on adjacent drum units 160 are thereby placed in abutting relation. A waterproof silicon sealant coating 248 is applied across the joints between splicer rings 242 and drum units 160 to prevent leakage therebetween.

Figure 30:
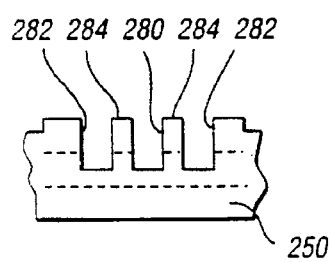
FIG. 30 is a fragmentary view taken along line 30—30 in FIG. 26.
Figure 31:
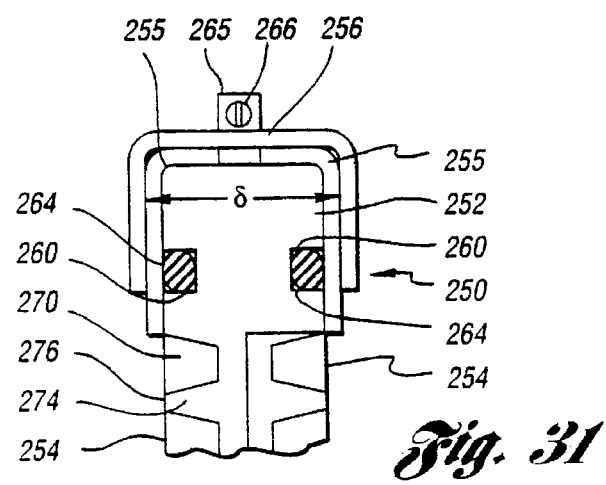
FIG. 31 is an enlarged fragmentary view of encircled area 31 of the inner support structure of FIG. 28 with a pair of screen elements and a retainer assembly secured thereabout.

FIGS. 26–31 show components of an alternative disc filter element 250, a fragmentary portion of which is shown in FIG. 31. This particular disc filter element 250 has circumferentially extending channels connecting to radially extending channels which lead to an evacuating mandrel. This particular design has proven advantageous in that liquid and air entrapped in the liquid are kept flowing throughout disc filter element 250 and minimal air pockets are formed in the filter element 250 due to air coming out of the liquid. In contrast, disc filter elements using only radial channels tend to have air pockets form at their top arcuate portion. This creates a fluid blockage in this region and therefore less area of the overall disk filter element is available for filtering contaminants through the filter element.

As seen in FIG. 31, disc filter element 250 includes an inner support structure 252, a pair of laterally spaced screen elements 254, a pair of opposing inner retainers 255, and an outer retainer 256. A pair of circumferentially extending trapezoidal shaped channels 260 are formed along the outer diameter of inner structure 252 to retain elastomeric O-rings 264.

Inner support structure 252 is a plastic molded component. Inner retainers 255 are L-shaped in cross-section and are circumferentially continuous. Outer retainer 256 is U-shaped in cross-section and is circumferentially split having a pair of circumferentially spaced apart ends. A conventional band clamp 265 with screw 266 preferably is used to draw the ends of outer retainer 256 into abutting relationship with respect to one another to effect the clamping together of the filter element 250. The inner width 6 of retainer 256 is ideally 0.001–0.003" narrower than the combined width of inner retainers 255, screen elements 254 and inner structure 252 to effectively laterally clamp disc filter element 250 together. O-rings 264 seal between inner support structure 252 and screen elements 254 to prevent contaminated fluid from reaching the interior of filter element 250. The assembly of filter element 250 is easily performed and effectively seals contaminated fluid from reaching inner support structure 252.

Figure 26:
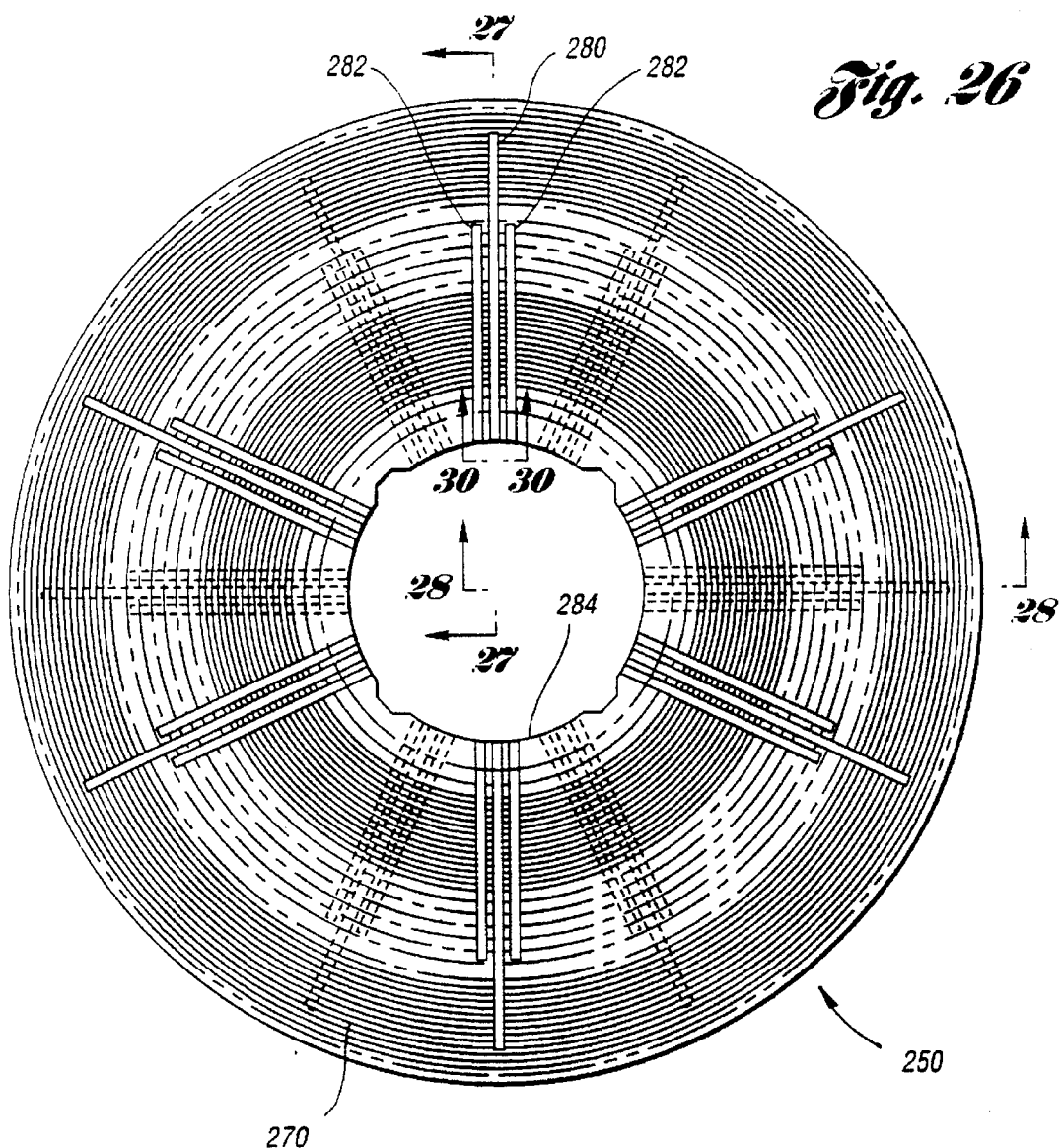
FIG. 26 is a front elevational view of a disc inner support structure of a disc filter element.
Figure 27:
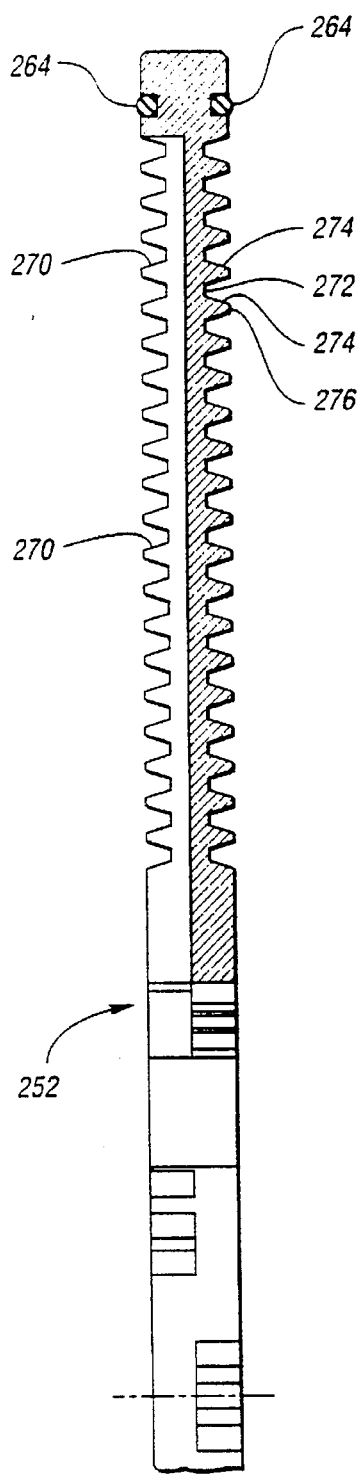
FIG. 27 is an enlarged sectional view taken along line 27—27 of FIG. 26.
Figure 28:
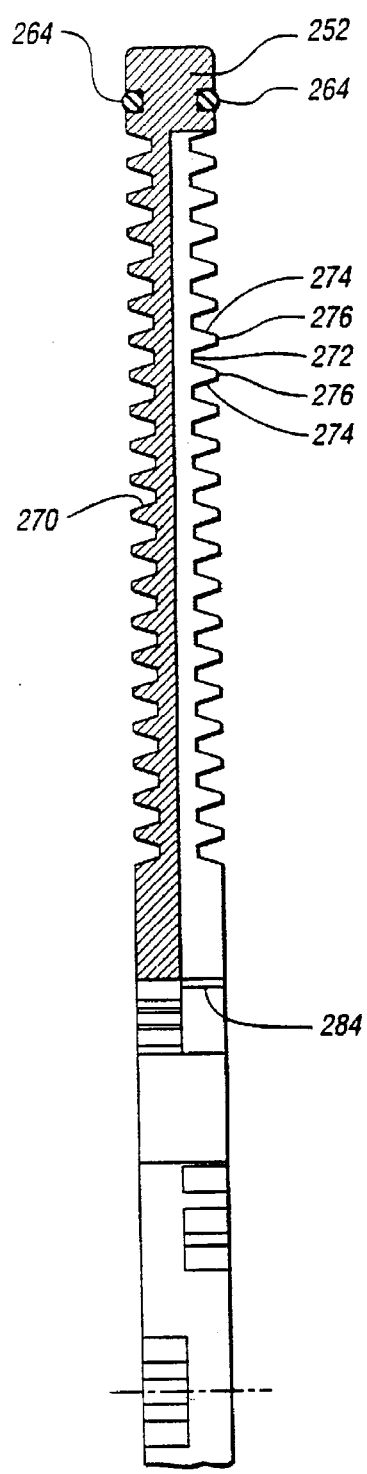
FIG. 28 is an enlarged sectional view taken along line 28—28 of FIG. 26.

Referring now to FIGS. 26–28, inner support structure 252 includes a plurality of concentric channels 270. In the preferred embodiment, there are a total of 21 concentric channels 270. Channels 270 include a root 272 sandwiched between a pair of radially extending and spaced apart ribs 274 having planar lands 276. In this preferred embodiment, the distance between ribs is ¼" on centers, each of the lands having a total width of ¹⁄₁₆", and the height of ribs 274 is ⅜". Roots 272 are preferably an ⅛" wide. The overall thickness of the inner structure 252 is ¾". These dimensions have been found to provide good support to screen elements 254 while allowing satisfactory flow of machine tool coolant from outside filter element 250 into concentric channels 270 during filtering.

Radially extending channels 280 and 282 connect with concentric channels 270 to provide a pathway for fluid flow to an inner periphery 284. Radial channels 282 are arranged in pairs sandwiching about a single longer channel 280. Each set of three channels 280 and 282 are circumferentially spaced apart and are alternately located on either side of inner support structure 252. The longer radial channels 280 extend from the inner periphery 284 to the outermost circumferential channel 270. The shorter radial channels 282 extend from the ninth circumferential channel from the outside of inner support structure 252 to inner periphery 284. Therefore, fluid flow from the outermost channels 270 primarily move through radial channels 280 and fluid flow from the inner channels 270 move through radial channels 282. Inner periphery 284 is again configured to fluidly mate with mandrel 100 as was described earlier with respect to filter elements 88.

FIG. 30 shows a cross-section of radial channels 280 and 282. In the preferred embodiment, radial channels 280 and 282 are approximately ⅜" deep and ¼" wide. The width of lands 284 between the channels is approximately ¼".

Figure 29:
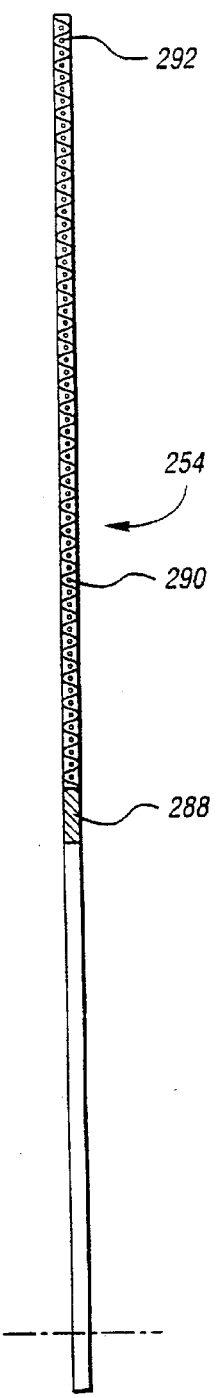
FIG. 29 is a fragmentary portion of a microscreen element used with the disc filter element.

FIG. 29 is an enlarged fragmentary sectional view of a screen element 254. Each screen element 254 has circumferential extending inner radial bearing ring 288 integrally formed with perforated screen 290. The outer circumferential periphery 292 of each screen element 254, as seen in FIG. 31, is clamped between inner retainer 255 and inner structure 252. O-rings 264 are captured between screen elements 254 backed by inner retainers 255 and inner support structure 252. Inner bearing ring 288 is sealingly captured against inner structure 252 by spacer elements 108 as has been previously described with respect to filter disc element 88 and as shown in FIG. 10. It is likewise possible to use a non-perforated section for the outer circumferential periphery 292.

FIGS. 32–35 illustrate an alternative embodiment of a disc filter element 300 which is rectangular in shape. Filter element 300 includes a folded or pleated inner structure 302, a pair of screen elements 304, a U-shaped closure channel 306 extending about the periphery of filter element 300 and a pair of U-shaped retainer clips 310.

A mandrel 312 fluidly communicates with and supports the top of disc filter element 300 to evacuate disc filter element 300. Mandrel 312 is in fluid communication with a pump P as similarly described above with respect mandrel 100. Also, similar to the arrangement shown in FIG. 10, a plurality of disc filter elements 300 can be spaced longitudinally along mandrel 312 to provide a large filter area.

Inner structure 302 is economical to make. Preferably, it is made of metal which is easily pleated or folded and can be readily made from a thin sheet of metal. Inner structure 302 includes a pleated portion 314 and a pair of laterally spaced end portions 316. Vertical passageways 317, triangular in cross-section, as shown in FIG. 34, are bounded by the pleated portion 314 and screen elements 304. Screen elements 304 each have an inner rectangular perforated screen portion 320 surrounded by a peripherally extending non-perforated edge portion 322.

Closure channel 306 has a pair of spaced apart leg portions 324 connected by a bight portion 326. Bight portion 326 extends peripherally about inner structure 302. Along the end portions 316 of inner structure 302, retainer clips 310 clampingly secure edge portion 316 of inner structure 302 and edge portions 322 of screen elements 304 together as shown in FIG. 34. Retainer clips 310 include spaced apart legs 318.

Referring now to FIG. 35, along the upper horizontal edge of disc filter element 300, a pair of L-shaped brackets 330 secure disc filter element 300 to mandrel 312. Threaded fasteners 332 secure brackets 330 to mandrel 312. Likewise, threaded fasteners 334 pass through leg portions 318 of retainer clips 310, end portions 316 of screen elements 304 and are received into threaded nuts 336 welded to the inner side of closure channel 306.

Openings 338 and 340 are formed in respective mandrel 312 and closure plate 306 with a conduit 342 being press fit in openings 338 and 340. Conduit 342 has a washer 344 secured thereon which sealingly compresses an O-ring 346 against bight portion 326 of closure channel 306 to seal about opening 340. This compression occurs when brackets 330 are mounted to mandrel 312. A horizontal chamber 350 is formed bounded by inner structure 302 and bight portion 326 to provide a horizontal passageway connecting with each of vertically extending passageways 317.

Accordingly, fluid may pass through perforated portions 320 of screen element 304, travel upwardly through the respective vertical passageways 317, pass along horizontal chamber 350, and be evacuated through conduit 342 into mandrel 312. O-ring 346 prevents contaminated fluid from passing through opening 340 and into inner structure 302.

While the best modes for carrying out the invention has been described in detail, those familiar with the art to which this invention relates will recognize various alternative embodiments for practicing the invention as defined by the following claims.

What is claimed is:

1. An immersible filter drum unit for filtering contaminants from a fluid and extending along a longitudinal axis, the filter drum unit comprising:

a generally cylindrically-shaped open perforated support plate which is generally concentric with the longitudinal axis and has first and second longitudinally extending ends, the support plate being elastically deformable to vary its circumference, the support plate having an inner surface and an outer surface, the inner surface forming an interior of the support plate to provide an outlet for the fluid;

a cylindrical screen element surrounding, and radially supported by, the outer surface of the support plate, the screen element providing an inlet for the fluid; and a circumference adjustor within the interior of the support plate and cooperating with the inner surface of the support plate for varying the circumference of the support plate;

wherein the circumference of the support plate is reducible to allow the cylindrical screen element to be placed over the support plate and the circumference of the support plate is expand able to place the screen element in a taut relationship about the support plate.

2. The filter drum unit of claim 1 wherein:
the screen element has first and second longitudinally extending ends which are secured together forming a seam.

3. The filter drum unit of claim 1 wherein:
the screen element is seamless.

4. The filter drum unit of claim 1 wherein:
the circumference adjustor cooperates with the inner surface of the support plate to selectively position the support plate between a circumferentially contracted shape, wherein the first and second longitudinally extending ends of the support plate overlap one another with the screen element being slidably mountable over the outer surface of the support plate, and in a circumferentially expanded shape, wherein the first and second longitudinally extending ends of the support plate abut one another so that the outer surface of the support plate has a generally smooth continuous outer cylindrical periphery about which the screen element is tautly stretched when it is supported by the outer surface of the support plate.

5. The filter drum unit of claim 1 further comprising:
at least one longitudinal spaced open ring generally coaxially aligned about the longitudinal axis and radially supporting the perforated support plate, the circumference adjustor varying the circumference of the ring to control the circumference of the support plate and the tautness of the screen element.

6. The filter drum unit of claim 5 wherein:
the circumference adjustor includes a variable length turnbuckle connecting to the ring such that the varying of the length of the turnbuckle will vary the circumference of the ring.

7. The filter drum unit of claim 5 wherein:
the ring includes a pair of arcuate arms each having a proximate end and a distal end, wherein the circumference adjustor pivotally connects the proximate ends to one another with the distal ends being translatable relative to one another to vary the circumference of the ring.

8. The filter drum unit of claim 1 further comprising:
a coupling segment extending radially inwardly relative to the support plate and having an aperture therein adapted to receive a tie rod;
whereby a plurality of filter drum units are coaxially aligned along the longitudinal axis with a tie rod coaxially passing through the aperture of each coupling segment clampingly holding together the plurality of filter drum units to form a filter assembly.

9. A method for assembling an immersible filter drum unit, the method comprising:

providing a generally cylindrically-shaped perforated open support plate which is variable in circumference and which is generally concentric with a longitudinal axis and has first and second longitudinally extending ends;

placing a flexible cylindrical screen element over the support plate; and expanding the circumference of the support plate to tautly position the screen element about the support plate.

10. The method of claim 9 wherein:
the expanding of the circumference of the support plate includes lengthening at least one turnbuckle which is connected relative to the support plate.

11. The method of claim 9 further comprising:
joining a plurality of filter drum units together along the longitudinal axis to form an elongate filter drum assembly.

12. An immersible filter drum assembly for filtering contaminants from a fluid and extending along a longitudinal axis, the filter drum assembly comprising:

a plurality of filter drum units, at least one filter drum unit including:

a generally cylindrically-shaped perforated open support plate which is generally concentric about the longitudinal axis and has first and second longitudinally extending ends, the support plate being elastically deformable to vary the circumference of the support plate, the support plate having an inner surface and an outer surface, the inner surface forming an interior of the support plate to provide an outlet for the fluid;

a flexible cylindrical screen element surrounding, and radially supported by, the outer surface of the support plate, the screen element providing an inlet for the fluid; and a circumference adjustor within the interior of the support plate and cooperating with the inner surface of the support plate for varying the circumference of the support plate wherein the circumference of the support plate is reducible to allow the screen element to be slid over the support plate and the circumference of the support plate is expand able to place the screen element in a taut relationship about the support plate; and at least one tie rod clampingly securing the plurality of filter drum units together to form the filter drum assembly.

13. The filter drum assembly of claim 12 wherein:
the screen element is seamless and is a closed cylinder.

14. The filter drum assembly of claim 12 wherein:
the circumference adjustor cooperates with the inner surface of the support plate to selectively position the support plate between a circumferentially contracted shape, wherein the first and second longitudinally extending ends of the support plate overlap one another with the screen element being slidable over the outer surface of the support plate, and in a circumferentially expanded shape, wherein the first and second ends of the support plate abut one another so that the outer surface of the support plate has a generally smooth continuous outer cylindrical periphery about which the screen element is tautly stretched when it is supported by the outer surface of the support plate.

15. The filter drum assembly of claim 12 further comprising:

at least one open ring coaxially aligned about the longitudinal axis and radially supporting the perforated support plate, the circumference adjustor varying the circumference of the ring to control the circumference of the support plate and the tautness of the screen element.

16. The filter drum assembly of claim 15 wherein:

the circumference adjustor includes at least one variable length turnbuckle connecting to the at least one open ring such that varying the length of the turnbuckle varies the circumference of the ring.

17. The filter drum assembly of claim 16 wherein:

the at least one open ring includes a pair of arcuate arms each having a proximate end and a distal end, wherein the circumference adjustor pivotally connects the proximate ends to one another with the distal ends being translatable relative to one another to vary the circumference of the ring.

* * * * *

UNITED STATES PATENT AND TRADEMARK OFFICE
CERTIFICATE OF CORRECTION

PATENT NO. : 5,637,213

DATED : June 10, 1997

INVENTOR(S) : STEPHEN N. MCEWEN et al.

It is certified that error appears in the above-identified patent and that said Letters Patent is hereby corrected as shown below:

Column 13, Line 14, Claim 1, delete "expand able" and insert therefor --expandable--.

Column 14, Line 42, Claim 12, delete "expand able" and insert therefor --expandable--.

Signed and Sealed this

Sixteenth Day of June, 1998

Attest:

BRUCE LEHMAN

Attesting Officer

Commissioner of Patents and Trademarks